(12) United States Patent
Gou et al.

(10) Patent No.: US 11,394,513 B2
(45) Date of Patent: Jul. 19, 2022

(54) CONFIGURATION METHOD AND DEVICE FOR DATA TRANSMISSION STRUCTURE

(71) Applicant: ZTE Corporation, Guangdong (CN)

(72) Inventors: Wei Gou, Guangdong (CN); Feng Bi, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/100,600

(22) Filed: Nov. 20, 2020

(65) Prior Publication Data

US 2021/0075576 A1 Mar. 11, 2021

Related U.S. Application Data

(63) Continuation of application No. 16/300,485, filed as application No. PCT/CN2017/083811 on May 10, 2017, now abandoned.

(30) Foreign Application Priority Data

May 13, 2016 (CN) .......................... 201610319550.9

(51) Int. Cl.
*H04L 5/00* (2006.01)
*H04L 27/26* (2006.01)

(52) U.S. Cl.
CPC .......... *H04L 5/0053* (2013.01); *H04L 5/0007* (2013.01); *H04L 5/0044* (2013.01);
(Continued)

(58) Field of Classification Search
CPC ... H04L 5/0053; H04L 5/0007; H04L 5/0044; H04L 5/0048; H04L 5/0082;
(Continued)

(56) References Cited

U.S. PATENT DOCUMENTS 9,768,942 B2 9/2017 Golitschek Edler Von Elbwart et al.
10,637,626 B2 4/2020 Li et al.
(Continued)

FOREIGN PATENT DOCUMENTS

CN 101379860 A 3/2009
CN 102421195 A 4/2012
(Continued)

OTHER PUBLICATIONS

International Search Report dated Aug. 1, 2017 for International Application No. PCT/CN2017/083811, 2 pages.
(Continued)

*Primary Examiner* — Vinncelas Louis
(74) *Attorney, Agent, or Firm* — Perkins Coie LLP

(57) ABSTRACT

Provided are a configuration method and apparatus for a data transmission structure, which include: acquiring a transmission data parameter group, and configuring, according to a preset configuration order, the transmission data parameter group to obtain a transmission unit, where the preset configuration order is a configuration order determined based on a demand of a transmission service. By the present invention, the problem of unable to transmit uplink control due to an unsuccessful CCA in the related art may be solved, thereby improving the frequency spectrum efficiency.

20 Claims, 3 Drawing Sheets

(52) U.S. Cl.
CPC .......... *H04L 5/0048* (2013.01); *H04L 5/0082* (2013.01); *H04L 5/0091* (2013.01); *H04L 27/26* (2013.01); *H04L 5/0023* (2013.01)

(58) Field of Classification Search
CPC ..... H04L 5/0091; H04L 27/26; H04L 5/0023; H04L 27/2602; H04W 72/1257; H04W 72/1284
See application file for complete search history.

(56) References Cited

U.S. PATENT DOCUMENTS

| | | | |
|---|---|---|---|
| 10,667,243 B2 * | 5/2020 | Lee | .................. H04W 72/0406 |
| 2010/0271972 A1 | 10/2010 | Fujii et al. | |
| 2016/0073392 A1 | 3/2016 | Byun et al. | |

FOREIGN PATENT DOCUMENTS

| | | |
|---|---|---|
| CN | 102938935 A | 2/2013 |
| CN | 105517061 A | 4/2016 |
| CN | 105577339 A | 5/2016 |
| EP | 2995020 A1 | 3/2016 |
| WO | 2015158111 A1 | 10/2015 |
| WO | 2016073039 A1 | 5/2016 |

OTHER PUBLICATIONS

Written Opinion of the International Searching Authority dated Aug. 1, 2017 for International Application No. PCT/CN/2017/083811, 5 pages.

* cited by examiner

CONFIGURATION METHOD AND DEVICE FOR DATA TRANSMISSION STRUCTURE

CROSS REFERENCE TO RELATED APPLICATIONS

This patent document is a continuation of and claims the benefit of U.S. patent application Ser. No. 16/300,485, filed Nov. 9, 2018, which is a 371 of International Patent Application No. PCT/CN2017/083811, filed May 10, 2017, which claims the benefit of priority to Chinese Patent Application No. 201610319550.9, filed May 13, 2016. The entire contents of the before-mentioned patent applications are incorporated by reference as part of the disclosure of this patent document.

TECHNICAL FIELD

The present invention relates to an application field of communication technologies and, in particular, to a configuration method and apparatus for a data transmission structure.

BACKGROUND

With continuous advance in radio technologies, various radio services are flourishing. However, frequency spectrum resources on which the radio services are based are limited. To confront with increasing demands for bandwidth by people, the frequency spectrum resources of 300 MHz-3 GHz mainly used by the traditional commercial communications are extremely short and cannot meet the demands of future wireless communications.

In the future wireless communications, communications will be performed by adopting a carrier frequency, such as 28 GHz, 45 GHz and the like, higher than the carrier frequency adopted by the fourth-generation (4G) communication system. This type of high frequency channel has defects of a larger free propagation loss, being easily absorbed by oxygen and being affected by rain attenuation, which seriously affects coverage performance of the high frequency communication system. However, the carrier frequency corresponding to the high frequency communication has a shorter wavelength, so it may ensure that more antenna elements are able to be accommodated in per unit area. The more antenna elements mean that a beamforming method may be adopted to improve antenna gains, thereby ensuring the coverage performance of the high frequency communication. In the higher frequency band, there are a large number of unlicensed carriers and shared licensed carriers.

At present, communication networks of the long term evolution (LTE) are deployed in licensed carriers for operation. With the development of the LTE, some companies have proposed "a research subject on deploying LTE in unlicensed carriers". For example, Qualcomm in the United States believes that, with a rapid growth of data services, licensed carriers will not be able to bear the huge amount of data brought by the rapid growth of services in the near future. It is considered that deploying the LTE in unlicensed carriers to share data traffic in the licensed carriers may relieve pressure of the amount of data caused by the service growth. Meanwhile, the unlicensed carriers have the following characteristics: on the one hand, the unlicensed carriers do not need to be purchased or carrier resources are zero-cost, thus the unlicensed carriers are free or low-cost; on the other hand, either individuals or enterprises can participate in deployment, so does equipments of equipment vendors, therefore, the unlicensed carriers have a low requirement for being accessed. Moreover, the unlicensed carriers are featured by sharing. When multiple different systems or different operators in the same system are operating therein, ways of resource sharing may be considered to improve the carrier efficiency.

The shared licensed carrier, that the same frequency spectrum is allocated for multiple operators and the multiple operators use the same frequency spectrum together, have similar characteristics with the unlicensed carrier and may have similar problems (taking the unlicensed carrier as an example below).

In conclusion, although deploying the LTE in unlicensed carriers (the existing LTE is deployed in the licensed carriers, and one frequency spectrum is just for one operator) has obvious advantages, in the process of deployment, problems still exist. There are too many wireless access technologies (which cross different communication standards, are difficult to cooperate with each other, and network topologies of which are various) and too many wireless access stations (in which there is a large number of users, it is difficult to cooperate with each other and there is the large amount of centralized management overhead). Due to the too many wireless access technologies, various wireless systems exist in the unlicensed carriers, and the various wireless systems are difficult to cooperate with each other and generate serious interference to each other. Therefore, for deploying the LTE in the unlicensed carriers, it is still necessary to support regulations of the unlicensed carriers. It is required in most countries that, when the system is deployed in the unlicensed carrier, the system needs to support a listen before talk mechanism. The listen before talk mechanism may avoid the interference of adjacent systems which is caused by the simultaneous use of the unlicensed carrier between adjacent systems. Furthermore, a contention backoff mechanism is also introduced, that is, adjacent system stations (generally adjacent transmission nodes in the same system), by the contention backoff mechanism, may avoid the interference caused by simultaneously using the unlicensed carrier by the adjacent transmission nodes of the same system. In addition, the regulations regulate that the listen before talk mechanism (that is, a clear channel assessment (CCA), also called listen before talk (LBT)) needs to be performed on the apparatus using the unlicensed carriers (including a base station and UE) before transmission. When an unlicensed carrier channel is clear, the apparatus can use the unlicensed carrier channel to perform the data transmission.

Some wireless data and control structures designed for the fifth generation wireless communication technology (5G) are described below. FIG. 1 is a structural diagram of a transmission unit in the related art. As shown in FIG. 1, such structure may be regarded as one basic transmission unit, such as one TTI composed of multiple OFDM symbols or one subframe composed of multiple TTIs. The downlink control is information of control type which is related to downlink data and transmitted to the UE by the base station. Guard period (GP) is time for implementing state transition of receiving/transmitting. Uplink data is data transmitted by the UE to the base station. The uplink control is information transmitted by the UE to the base station, such as ACK/NACK feedback information of downlink data receiving, channel state information, scheduling request and the like, which are information, in addition to the uplink data, needed to be transmitted to the base station by the UE.

The following basic characteristics may be seen in FIG. 1.

1. When a subframe (or a TTI, the following takes the subframe as an example) includes the uplink data, the uplink control is always at the end of the subframe and is consecutive with the uplink data (without the guard period).

2. The downlink control is always at the front of the subframe, and the guard period is left between the uplink data and the downlink control.

The following problems exist in the above design. The following problems may exist in a given scenario, such as in a case of unlicensed carriers or shared licensed carriers.

Problem 1, in some areas where regional/national regulations for the frequency spectrum exist, the CCA detection must be performed before the apparatus transmits the data. For example, in a case that the UE has the uplink control (such as a UCI) but has no uplink data in the subframe (or the TTI), if the uplink control needs to be transmitted, such UE needs to perform the CCA detection. However, no clear symbol is reserved between the uplink data and the uplink control in the subframe, such UE cannot perform the CCA, and finally such UE is unable to transmit the uplink control due to the unsuccessful CCA.

Problem 2, even if in a non-regulated area, i.e., when the CCA detection is not required to be performed before the apparatus transmits the data, in combination with the problem 1, the UE which needs to transmit the uplink control may affect an adjacent UE which is transmitting, i.e., may simultaneously use the carrier with the adjacent station to transmit signals. In this case, a potential interference problem exists.

SUMMARY

Embodiments of the present invention provide a configuration method and apparatus for a data transmission structure to solve at least a problem of unable to transmit uplink control due to an unsuccessful CCA in the related art.

A configuration method for a data transmission structure is provided according to an embodiment of the present invention. The configuration method for a data transmission structure includes: acquiring a transmission data parameter group; configuring, according to a preset configuration order, the transmission data parameter group to obtain a transmission unit. The preset configuration order is a configuration order determined based on a demand of a transmission service.

Alternatively, in a case where the transmission data parameter group includes an uplink data area, a downlink control area, a guard period area, a first uplink control area and a second uplink control area, the preset configuration order is the downlink control area, the guard period, the first uplink control area, the uplink data area and the second uplink control area.

Alternatively, time domain resources of the first uplink control area and the second uplink control area are preset or dynamically configured by a device, or total time domain resources of the first uplink control area and the second uplink control area are fixed and each time domain resource in the total time domain resources is configured by the device; or whether or not the first uplink control area exists is dynamically configured by the device, and preferably, when there is a user equipment (UE) which is a UE only with uplink control needed to be transmitted, the device configures that the first uplink control area exists, otherwise the device is allowed to configure that the first uplink control area does not exist.

Alternatively, during the guard period area, a UE transmitting data in at least one of the first uplink control area or the uplink data area performs a clear channel assessment (CCA) detection.

Further, alternatively, one of a starting orthogonal frequency division multiplexing (OFDM) symbol or a starting time point of at least one of the first uplink control area or the uplink data area is configured by a device, or configured according to a preset condition.

Alternatively, one of an ending OFDM symbol or an ending time point of at least one of the first uplink control area or the uplink data area is configured by a device, or configured according to a preset condition.

Further, alternatively, in a process of configuration, a base station configures by at least one of a higher layer signaling or a physical layer signaling.

Alternatively, the physical layer signaling is transmitted in the downlink control area through a physical layer.

Alternatively, the downlink control area includes at least one of: a control signaling or authorization information used for an uplink data transmission, or a control signaling used for a downlink data transmission.

Alternatively, the method further includes: in a case where there is a UE only with uplink control needed to be transmitted in the transmission unit, the UE using the first uplink control area to transmit. Preferably, the UE performs a CCA detection in the guard period area.

Alternatively, the method further includes: a UE not only with uplink control needed to be transmitted but also with uplink data needed to be transmitted in the transmission unit, using at least one of the first uplink control area or the second uplink control area to transmit the uplink control. Preferably, the UE performs a CCA detection in the guard period area.

Alternatively, the method further includes: a UE not only with uplink control needed to be transmitted but also with uplink data needed to be transmitted in the transmission unit, using the first uplink control area to transmit the uplink control, and using the uplink data area to transmit the uplink data. Preferably, the UE performs a CCA detection in the guard period area.

Alternatively, the method further includes: a UE only with uplink data needed to be transmitted in the transmission unit, keeping silent in the first uplink control area, or transmitting a signal in a frequency domain resource corresponding to the uplink data, or transmitting a false uplink control, or transmitting a signal at a resource position agreed in advance. Preferably, the UE performs a CCA detection in the guard period area.

Further, alternatively, the false uplink control is transmitted by the UE in frequency domain resources pre-allocated or set for the UE in the first uplink control area.

Alternatively, in the first uplink control area, a part of frequency domain resources is pre-allocated or pre-agreed for the UE to transmit the false uplink control; and where the part of frequency domain resources is discrete in the frequency domain.

Alternatively, the part of frequency domain resources is evenly discrete in the frequency domain.

Alternatively, the method further includes: configuring or not configuring the first uplink control area according to a preset transmission demand. When not configuring, in a case where the transmission data parameter group includes the uplink data area, the downlink control area, the guard period area and the second uplink control area, the preset configuration order is the downlink control area, the guard period, the uplink data area and the second uplink control area. Or the method further includes: configuring or not configuring the second uplink control area according to a preset transmission demand. When not configuring, in a case where the transmission data parameter group includes the uplink data area, the downlink control area, the guard period area and the first uplink control area, the preset configuration order is the downlink control area, the guard period, the first uplink control area and the uplink data area.

Alternatively, after the configuring or not configuring the first uplink control area or the second uplink control area according to the preset transmission demand, the method further includes: in a case of configuring or not configuring the second uplink control area, configuring the second uplink control area for uplink data or to keep an idle state; or in a case of configuring or not configuring the first uplink control area, configuring the first uplink control area for uplink data or to keep an idle state.

Alternatively, in a case of not configuring the downlink control area and the guard period area, the downlink control area and the guard period area are configured as at least one of the first uplink control area or the uplink data area.

Alternatively, in a case of not configuring the downlink control area but configuring the guard period area, the downlink control area is configured as at least one of the guard period area, the first uplink control area or the uplink data area.

Alternatively, the method further includes: combining a plurality of same or different transmission units obtained according to the preset configuration order into one consecutive transmission unit in time.

Alternatively, in a case where the transmission data parameter group includes an uplink data area, a downlink control area, a first guard period area, a second guard period area and an uplink control area, the preset configuration order is the downlink control area, the first guard period area, the uplink data area, the second guard period area and the uplink control area.

Alternatively, the method further includes that: time domain resources of the first guard period area and the second guard period area are agreed in advance or dynamically configured by a device; or total time domain resources of the first guard period area and the second guard period area are fixed, where the time domain resources of the first guard period area and the second guard period area are configured by the device.

Alternatively, the first guard period area and the second guard period area are used for performing a CCA detection by a UE transmitting data in the uplink data area and the uplink control area.

Alternatively, one of a starting OFDM symbol or a starting time point of at least one of the uplink control area or the uplink data area is configured by a device or agreed according to a preset condition.

Alternatively, one of an ending OFDM symbol or an ending time point of the uplink data area is configured by a device or configured according to a preset condition.

Alternatively, in a process of configuration, a base station configures by at least one of a higher layer signaling or a physical layer signaling.

Alternatively, the physical layer signaling is transmitted in the downlink control area through a physical layer.

Alternatively, the downlink control area includes at least one of: a control signaling or authorization information used for an uplink data transmission, or a control signaling used for a downlink data transmission.

Alternatively, the method further includes: in a case where there is a UE only with uplink control needed to be transmitted in the transmission unit, the UE using the uplink control area to transmit; and preferably, the UE performing a CCA detection in the second guard period area.

Alternatively, a UE not only with uplink control needed to be transmitted but also with uplink data needed to be transmitted in the transmission unit, transmitting the uplink data in the uplink data area and the uplink control in the uplink control area respectively; and preferably, the UE performing a CCA detection in the first guard period area and the second guard period area respectively.

Alternatively, the method further includes: a UE not only with uplink control needed to be transmitted but also with uplink data needed to be transmitted in the transmission unit, transmitting the uplink data in the uplink data area, the uplink data in the second guard period area and the uplink control in the uplink control area; and preferably, the UE performing a CCA detection in the first guard period area.

Alternatively, the method further includes: a UE not only with uplink control needed to be transmitted but also with uplink data needed to be transmitted in the transmission unit, transmitting the uplink data in the uplink data area, keeping silent and not performing a CCA detection in the second guard period area, and directly transmitting the uplink control in the uplink control area; and preferably, the UE performing a CCA detection in the first guard period area.

Alternatively, the method further includes: a UE only with uplink data needed to be transmitted in the transmission unit, transmitting uplink data in the uplink data area; and preferably, the UE performing a CCA detection in the first guard period area.

Alternatively, the method further includes: combining a plurality of same or different transmission units obtained according to the preset configuration order into one consecutive transmission unit in time.

A configuration apparatus for a data transmission structure is provided by another embodiment of the present invention. The configuration apparatus for a data transmission structure includes: an acquisition module and a configuration module. The acquisition module is configured to acquire a transmission data parameter group. The configuration module is configured to configure the transmission data parameter group according to a preset configuration order to obtain a transmission unit. The preset configuration order is a configuration order determined based on a demand of a transmission service.

Alternatively, in a case where the transmission data parameter group includes an uplink data area, a downlink control area, a guard period area, a first uplink control area and a second uplink control area, the preset configuration order is the downlink control area, the guard period, the first uplink control area, the uplink data area and the second uplink control area.

Alternatively, time domain resources of the first uplink control area and the second uplink control area are preset or are dynamically configured by a device; or total time domain resources of the first uplink control area and the second uplink control area are fixed, and each time domain resource in the total time domain resources is configured by the device; or whether or not the first uplink control area exists is dynamically configured by the device, and preferably, when there is a user equipment (UE) which is a UE only with uplink control needed to be transmitted, the device configures that the first uplink control area exists, otherwise the device is allowed to configure that the first uplink control area does not exist.

Further, alternatively, during the guard period area, a UE transmitting data in at least one of the first uplink control area or the uplink data area performs a clear channel assessment (CCA) detection.

Alternatively, one of a starting orthogonal frequency division multiplexing (OFDM) symbol or a starting time point of at least one of the first uplink control area or the uplink data area is configured by a device, or configured according to a preset condition.

Further, alternatively, one of an ending OFDM symbol or an ending time point of at least one of the first uplink control area or the uplink data area is configured by a device, or configured according to a preset condition.

Alternatively, in a process of configuration, a base station configures by at least one of a higher layer signaling or a physical layer signaling.

Alternatively, the physical layer signaling is transmitted in the downlink control area through a physical layer.

Alternatively, the downlink control area includes at least one of: a control signaling or authorization information used for an uplink data transmission, or a control signaling used for a downlink data transmission.

Alternatively, the apparatus further includes: a first configuration module. The first configuration module is configured to, in a case where there is a UE only with uplink control needed to be transmitted in the transmission unit, enable the UE to use the first uplink control area to transmit. Preferably, the UE performs a CCA detection in the guard period area.

Alternatively, the apparatus further includes: a second configuration module. The second configuration module is configured to enable a UE not only with uplink control needed to be transmitted but also with uplink data needed to be transmitted in the transmission unit to use at least one of the first uplink control area or the second uplink control area to transmit the uplink control. Preferably, the UE performs a CCA detection in the guard period area.

Alternatively, the apparatus further includes: a third configuration module. The third configuration module is configured to enable a UE not only with uplink control needed to be transmitted but also with uplink data needed to be transmitted in the transmission unit to use at least one of the first uplink control area or the second uplink control area to transmit the uplink control. Preferably, the UE performs a CCA detection in the guard period area.

Alternatively, the apparatus further includes: a fourth configuration module. The fourth configuration module is configured to enable a UE only with uplink data needed to be transmitted in the transmission unit to keep silent in the first uplink control area, or transmit a signal in a frequency domain resource corresponding to the uplink data, or transmit a false uplink control, or transmit a signal at a resource position agreed in advance. Preferably, the UE performs a CCA detection in the guard period area.

Further, alternatively, the false uplink control is transmitted by the UE in frequency domain resources pre-allocated or set for the UE in the first uplink control area.

Alternatively, in the first uplink control area, a part of frequency domain resources is pre-allocated or pre-agreed for the UE to transmit the false uplink control. The part of frequency domain resources is discrete in the frequency domain.

Further, alternatively, the part of frequency domain resources is evenly discrete in the frequency domain.

Alternatively, the apparatus further includes: a fifth configuration module. The fifth configuration module is configured to configure or not configure the first uplink control area according to a preset transmission demand. When not configuring, in a case where the transmission data parameter group includes the uplink data area, the downlink control area, the guard period area and the second uplink control area, the preset configuration order is the downlink control area, the guard period, the uplink data area and the second uplink control area. Or the fifth configuration module is configured to configure or not configure the second uplink control area according to a preset transmission demand. When not configuring, in a case where the transmission data parameter group includes the uplink data area, the downlink control area, the guard period area and the first uplink control area, the preset configuration order is the downlink control area, the guard period, the first uplink control area and the uplink data area.

Alternatively, the apparatus further includes: a sixth configuration module. The sixth configuration module is configured to, after configuring or not configuring the first uplink control area or the second uplink control area according to the preset transmission demand, in a case of configuring or not configuring the second uplink control area, configure the second uplink control area for uplink data or to keep an idle state, or in a case of configuring or not configuring the first uplink control area, configure the first uplink control area for uplink data or to keep an idle state.

Alternatively, the configuration module is configured to configure, in a case of not configuring the downlink control area and the guard period area, the downlink control area and the guard period area as at least one of the first uplink control area or the uplink data area.

Alternatively, the configuration module is configured to configure, in a case of not configuring the downlink control area but configuring the guard period area, the downlink control area as at least one of the guard period area, the first uplink control area or the uplink data area.

Alternatively, the apparatus further includes: a first combination module. The first combination module is configured to combine multiple same or different transmission units obtained according to the preset configuration order into one consecutive transmission unit in time.

Alternatively, in a case where the transmission data parameter group includes an uplink data area, a downlink control area, a first guard period area, a second guard period area and an uplink control area, the preset configuration order is the downlink control area, the first guard period area, the uplink data area, the second guard period area and the uplink control area.

Further, alternatively, time domain resources of the first guard period area and the second guard period area are agreed in advance or are dynamically configured by a device; or total time domain resources of the first guard period area and the second guard period area are fixed, where the time domain resources of the first guard period area and the second guard period area are configured by the device.

Alternatively, the first guard period area and second guard period area are used for performing a CCA detection by a UE transmitting data in the uplink data area and the uplink control area.

Alternatively, one of a starting OFDM symbol or a starting time point of at least one of the uplink control area or the uplink data area is configured by a device or agreed according to a preset condition.

Alternatively, one of an ending OFDM symbol or an ending time point of the uplink data area is configured by a device or configured according to a preset condition.

Alternatively, in a process of configuration, a base station configures by at least one of a higher layer signaling or a physical layer signaling.

Alternatively, the physical layer signaling is transmitted in the downlink control area through a physical layer.

Alternatively, the downlink control area includes at least one of: a control signaling or authorization information used for an uplink data transmission, or a control signaling used for a downlink data transmission.

Alternatively, the apparatus further includes: a seventh configuration module. The seventh configuration module is configured to, in a case where there is a UE only with uplink control needed to be transmitted in the transmission unit, enable the UE to use the uplink control area to transmit. Preferably, the UE performs a CCA detection in the second guard period area.

Alternatively, the apparatus further includes: an eighth configuration module. The eighth configuration module is configured to, in a case where there is a UE only with uplink control needed to be transmitted in the transmission unit, enable the UE to use the uplink control area to transmit. Preferably, the UE performs a CCA detection in the second guard period area.

Alternatively, the apparatus further includes: a ninth configuration module. The ninth configuration module is configured to enable a UE not only with uplink control needed to be transmitted but also with uplink data needed to be transmitted in the transmission unit to transmit the uplink data in the uplink data area, the uplink data in the second guard period area and the uplink control in the uplink control area. Preferably, the UE performs a CCA detection in the first guard period area.

Alternatively, the apparatus further includes: a tenth configuration module. The tenth configuration module is configured to enable a UE not only with uplink control needed to be transmitted but also with uplink data needed to be transmitted in the transmission unit to transmit the uplink data in the uplink data area, keep silent and not perform a CCA detection in the second guard period area, and directly transmit the uplink control in the uplink control area. Preferably, the UE performs a CCA detection in the first guard period area.

Alternatively, the apparatus further includes: an eleventh configuration module. The eleventh configuration module is configured to enable a UE only with uplink data needed to be transmitted in the transmission unit to transmit uplink data in the uplink data area. Preferably, the UE performs a CCA detection in the first guard period area.

Alternatively, the apparatus further includes: a second combination module. The second combination module is configured to, in a case where there is a UE only with uplink data needed to be transmitted in the transmission unit, enable the UE to perform a CCA detection in the first guard period area.

Another embodiment of the present invention further provides a storage medium. The storage medium is configured to store program codes for executing the following steps: acquiring a transmission data parameter group; configuring, according to a preset configuration order, the transmission data parameter group to obtain a transmission unit, where the preset configuration order is a configuration order determined based on a demand of a transmission service.

Alternatively, the storage medium is further configured to store program codes for executing the step described below. In a case where the transmission data parameter group includes an uplink data area, a downlink control area, a guard period area, a first uplink control area and a second uplink control area, the preset configuration order is the downlink control area, the guard period, the first uplink control area, the uplink data area and the second uplink control area.

Alternatively, the storage medium is further configured to store program codes for executing the steps described below. Time domain resources of the first uplink control area and the second uplink control area are preset or dynamically configured by a device, or total time domain resources of the first uplink control area and the second uplink control area are fixed, and each time domain resource in the total time domain resources is configured by the device. Or whether or not the first uplink control area exists is dynamically configured by the device, and preferably, when there is a user equipment (UE) which is a UE only with uplink control needed to be transmitted, the device configures that the first uplink control area exists, otherwise the device is allowed to configure that the first uplink control area does not exist.

Alternatively, the storage medium is further configured to store program codes for executing the step described below. During the guard period area, a UE transmitting data in at least one of the first uplink control area or the uplink data area performs a clear channel assessment (CCA) detection.

Further, alternatively, the storage medium is further configured to store program codes for executing the step described below. One of a starting orthogonal frequency division multiplexing (OFDM) symbol or a starting time point of at least one of the first uplink control area or the uplink data area is configured by a device, or configured according to a preset condition.

Alternatively, the storage medium is further configured to store program codes for executing the step described below. One of an ending OFDM symbol or an ending time point of at least one of the first uplink control area or the uplink data area is configured by a device, or configured according to a preset condition.

Alternatively, the storage medium is further configured to store program codes for executing the step described below. In a process of configuration, a base station configures by at least one of a higher layer signaling or a physical layer signaling.

Alternatively, the storage medium is further configured to store program codes for executing the step described below. The physical layer signaling is transmitted in the downlink control area through a physical layer.

Alternatively, the storage medium is further configured to store program codes for executing the step described below. The downlink control area includes at least one of: a control signaling or authorization information used for an uplink data transmission, or a control signaling used for a downlink data transmission.

Alternatively, the storage medium is further configured to store program codes for executing the steps described below. The method further includes: in a case where there is a UE only with uplink control needed to be transmitted in the transmission unit, the UE using the first uplink control area to transmit. Preferably, the UE performs a CCA detection in the guard period area.

Alternatively, the storage medium is further configured to store program codes for executing the steps described below. The method further includes: a UE not only with uplink control needed to be transmitted but also with uplink data needed to be transmitted in the transmission unit, using at least one of the first uplink control area or the second uplink control area to transmit the uplink control. Preferably, the UE performs a CCA detection in the guard period area.

Alternatively, the storage medium is further configured to store program codes for executing the steps described below. The method further includes: a UE not only with uplink control needed to be transmitted but also with uplink data needed to be transmitted in the transmission unit, using the first uplink control area to transmit the uplink control, and using the uplink data area to transmit the uplink data. Preferably, the UE performs a CCA detection in the guard period area.

Alternatively, the storage medium is further configured to store program codes for executing the steps described below. The method further includes: a UE only with uplink data needed to be transmitted in the transmission unit, keeping silent in the first uplink control area, or transmitting a signal in a frequency domain resource corresponding to the uplink data, or transmitting a false uplink control, or transmitting a signal at a resource position agreed in advance. Preferably, the UE performs a CCA detection in the guard period area.

Further, alternatively, the storage medium is further configured to store program codes for executing the step described below. The false uplink control is transmitted by the UE in frequency domain resources pre-allocated or set for the UE in the first uplink control area.

Alternatively, the storage medium is further configured to store program codes for executing the step described below. In the first uplink control area, a part of frequency domain resources is pre-allocated or pre-agreed for the UE to transmit the false uplink control. The part of frequency domain resources is discrete in the frequency domain.

Alternatively, the storage medium is further configured to store program codes for executing the step described below. The part of frequency domain resources is evenly discrete in the frequency domain.

Alternatively, the storage medium is further configured to store program codes for executing the steps described below. The method further includes: configuring or not configuring the first uplink control area according to a preset transmission demand. When not configuring, in a case where the transmission data parameter group includes the uplink data area, the downlink control area, the guard period area and the second uplink control area, the preset configuration order is the downlink control area, the guard period, the uplink data area and the second uplink control area. Or the method further includes: configuring or not configuring the second uplink control area according to a preset transmission demand. When not configuring, in a case where the transmission data parameter group includes the uplink data area, the downlink control area, the guard period area and the first uplink control area, the preset configuration order is the downlink control area, the guard period, the first uplink control area and the uplink data area.

Alternatively, the storage medium is further configured to store program codes for executing the steps described below. After the configuring or not configuring the first uplink control area or the second uplink control area according to the preset transmission demands, the method further includes: in a case of configuring or not configuring the second uplink control area, configuring the second uplink control area for uplink data or to keep an idle state; or in a case of configuring or not configuring the first uplink control area, configuring the first uplink control area for uplink data or to keep an idle states.

Alternatively, the storage medium is further configured to store program codes for executing the step described below. In a case of not configuring the downlink control area and the guard period area, the downlink control area and the guard period area are configured as at least one of the first uplink control area or the uplink data area.

Alternatively, the storage medium is further configured to store program codes for executing the step described below. In a case of not configuring the downlink control area but configuring the guard period area, the downlink control area is configured as at least one of the guard period area, the first uplink control area or the uplink data area.

Alternatively, the storage medium is further configured to store program codes for executing the step described below. The method further includes: combining multiple same or different transmission units obtained according to the preset configuration order into one consecutive transmission unit in time.

Alternatively, the storage medium is further configured to store program codes for executing the step described below. In a case where the transmission data parameter group includes an uplink data area, a downlink control area, a first guard period area, a second guard period area and an uplink control area, the preset configuration order is the downlink control area, the first guard period area, the uplink data area, the second guard period area and the uplink control area.

Alternatively, the storage medium is further configured to store program codes for executing the step described below. The method further includes: time domain resources of the first guard period area and the second guard period area are agreed in advance or dynamically configured by a device; or total time domain resources of the first guard period area and the second guard period area are fixed, where the time domain resources of the first guard period area and the second guard period area are configured by the device.

Alternatively, the storage medium is further configured to store program codes for executing the step described below. The first guard period area and the second guard period area are used for performing a CCA detection by a UE transmitting data in the uplink data area and the uplink control area.

Alternatively, the storage medium is further configured to store program codes for executing the step described below. One of a starting OFDM symbol or a starting time point of at least one of the uplink control area or the uplink data area is configured by a device or agreed according to a preset condition.

Alternatively, the storage medium is further configured to store program codes for executing the step described below. One of an ending OFDM symbol or an ending time point of the uplink data area is configured by a device or configured according to a preset condition Alternatively, the storage medium is further configured to store program codes for executing the step described below. In a process of configuration, a base station configures by at least one of a higher layer signaling or a physical layer signaling.

Alternatively, the storage medium is further configured to store program codes for executing the step described below. The physical layer signaling is transmitted in the downlink control area through a physical layer.

Alternatively, the storage medium is further configured to store program codes for executing the step described below. The downlink control area includes at least one of: a control signaling or authorization information used for an uplink data transmission, or a control signaling used for a downlink data transmission.

Alternatively, the storage medium is further configured to store program codes for executing the steps described below. The method further includes: in a case where there is a UE only with uplink control needed to be transmitted in the transmission unit, the UE using the uplink control area to transmit Preferably, the UE performs a CCA detection in the second guard period area.

Alternatively, the storage medium is further configured to store program codes for executing the steps described below. The method further includes: a UE not only with uplink control needed to be transmitted but also with uplink data needed to be transmitted in the transmission unit, transmitting the uplink data in the uplink data area and the uplink control in the uplink control area respectively. Preferably, the UE performs a CCA detection in the first guard period area and the second guard period area respectively.

Alternatively, the storage medium is further configured to store program codes for executing the steps described below. The method further includes: a UE not only with uplink control needed to be transmitted but also with uplink data needed to be transmitted in the transmission unit, transmitting the uplink data in the uplink data area, the uplink data in the second guard period area and the uplink control in the uplink control area. Preferably, the UE performs a CCA detection in the first guard period area.

Alternatively, the storage medium is further configured to store program codes for executing the steps described below. The method further includes: a UE not only with uplink control needed to be transmitted but also with uplink data needed to be transmitted in the transmission unit, transmitting the uplink data in the uplink data area, keeping silent and not performing a CCA detection in the second guard period area, and directly transmitting the uplink control in the uplink control area. Preferably, the UE performs a CCA detection in the first guard period area.

Alternatively, the storage medium is further configured to store program codes for executing the steps described below. The method further includes: a UE only with uplink data needed to be transmitted in the transmission unit, transmitting uplink data in the uplink data area. Preferably, the UE performs a CCA detection in the first guard period area.

Alternatively, the storage medium is further configured to store program codes for executing the step described below. The method further includes: combining multiple same or different transmission units obtained according to the preset configuration order into one consecutive transmission unit in time.

In embodiments of the present invention, the transmission data parameter group is acquired, the transmission data parameter group is configured according to the preset configuration order to obtain the transmission unit, in which the preset configuration order is the configuration order determined based on the demand of the transmission service. Thus, the problem of unable to transmit uplink control due to an unsuccessful CCA in the related art may be solved, thereby improving the frequency spectrum efficiency.

BRIEF DESCRIPTION OF DRAWINGS

The drawings described herein are used to provide a further understanding of the present invention and form a part of the present application. The exemplary embodiments and descriptions of the embodiments in the present invention are used to explain the present invention and not to limit the present invention in any improper way. In the drawings.

DETAILED DESCRIPTION

Hereinafter the present invention will be described in detail with reference to the drawings in conjunction with the embodiments. It is to be illustrated that if not in collision, the embodiments and features therein in the present application may be combined with each other.

It is to be illustrated that the terms "first", "second" and the like in the description, claims and drawings of the present invention are used to distinguish between similar objects and are not necessarily used to describe a particular order or sequence.

Embodiment One

Figure 2:
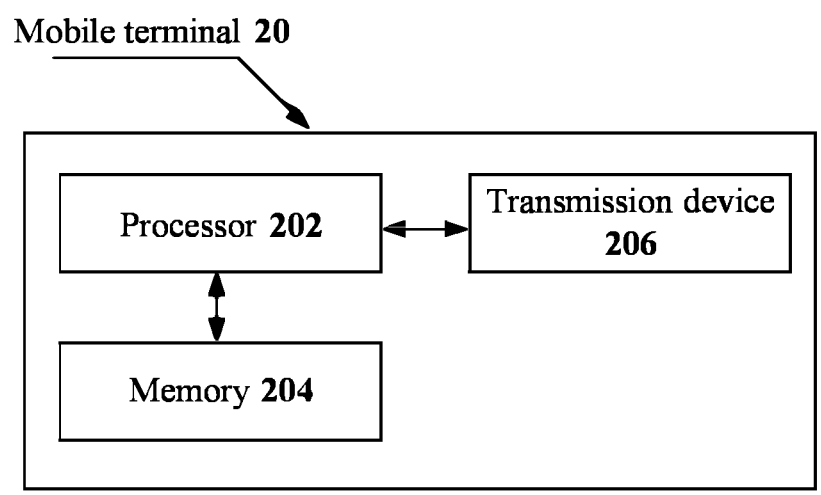
FIG. 2 is a block diagram of hardware of a mobile terminal of a configuration method for a data transmission structure according to an embodiment of the present invention.

Method embodiments provided by the embodiment one of the present application may be executed in a mobile terminal, a computer terminal, a base station, a relay equipment or other similar computing devices. Taking the mobile terminal operating the method as an example, FIG. 2 is a block diagram of hardware of a mobile terminal of a configuration method for a data transmission structure according to an embodiment of the present invention. As shown in FIG. 2, a mobile terminal 20 may include one or more (only one is shown in FIG. 2) processors 202 (in which the processor 202 may include, but is not limited to, a microprocessor MCU, a programmable logic device such as FPGA, or other processing devices), a memory 204 used for storing data, and a transmission device 206 used for implementing a communication function. It will be understood by those skilled in the art that the structure shown in FIG. 2 is merely illustrative and not intended to limit structures of the electronic devices described above. For example, the mobile terminal 20 may further include more or fewer components than the components shown in FIG. 2 or may have a configuration different from the configuration shown in FIG. 2.

The memory 204 may be used for storing software programs and modules of application software, such as program instructions/modules corresponding to the configuration method for the data transmission structure in the embodiment of the present invention. The processor 202 executes the software programs and modules stored in the memory 204 so as to execute various function applications and data processing, i.e., to implement the method described above. The memory 204 may include a high-speed random-access memory, and may further include a nonvolatile memory, such as one or more magnetic storage devices, flash memories or other nonvolatile solid-state memories. In some examples, the memory 204 may further include memories that are remotely disposed with respect to the processor 202. These remote memories may be connected to the mobile terminal 20 via a network. Examples of such a network include, but are not limited to, the Internet, an intranet, a local area network, a mobile communication network and a combination thereof.

The transmission device 206 is configured to receive or transmit data via a network. Specific examples of such a network may include a wireless network provided by a communication provider of the mobile terminal 20. In one example, the transmission device 206 includes a network interface controller (NIC), which may be connected to other network devices via a base station and thus be capable of communicating with the Internet. In one example, the transmission device 106 may be a radio frequency (RF) module, which is configured to communicate with the Internet in a wireless way.

Figure 3:
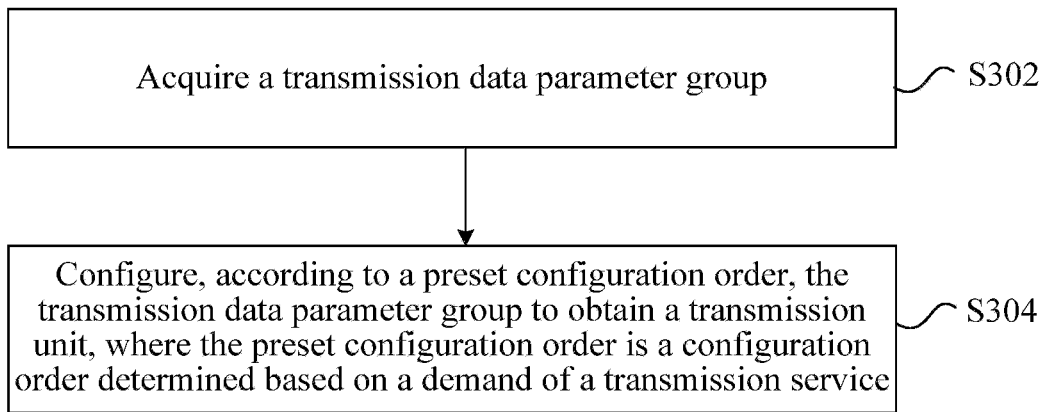
FIG. 3 is a flowchart of a configuration method for a data transmission structure according to an embodiment of the present invention.

This embodiment provides a method to be executed on the mobile terminal described above. FIG. 3 is a flowchart of a configuration method for a data transmission structure according to an embodiment of the present invention. As shown in FIG. 3, the method includes the steps described below.

In step S302: a transmission data parameter group is acquired.

In step S304: the transmission data parameter group is configured according to a preset configuration order to obtain a transmission unit. The preset configuration order is a configuration order determined based on a demand of a transmission service.

In the present invention, the transmission data parameter group is acquired, the transmission data parameter group is configured according to the preset configuration order to obtain the transmission unit, in which the preset configuration order is the configuration order determined based on the demand of the transmission service. Thus, the problem of unable to transmit uplink control due to an unsuccessful CCA in the related art may be solved, thereby improving the frequency spectrum efficiency.

Alternatively, in a case where the transmission data parameter group includes an uplink data area, a downlink control area, a guard period area, a first uplink control area and a second uplink control area, the preset configuration order is the downlink control area, the guard period, the first uplink control area, the uplink data area and the second uplink control area.

Alternatively, time domain resources of the first uplink control area and the second uplink control area are preset or dynamically configured by a device, or a total time domain resources of the first uplink control area and the second uplink control area are fixed and each time domain resource in the total time domain resources is configured by the device.

Alternatively, whether the first uplink control area exists is dynamically configured by the device. Preferably, when there is a user equipment (UE) which is a UE only with uplink control needed to be transmitted, the device configures that the first uplink control area exists, otherwise the device is allowed to configure that the first uplink control area does not exist.

Alternatively, during the guard period area, a UE transmitting data in at least one of the first uplink control area or the uplink data area performs a clear channel assessment (CCA) detection.

Further, alternatively, one of a starting orthogonal frequency division multiplexing (OFDM) symbol or a starting time point of at least one of the first uplink control area or the uplink data area is configured by a device, or configured according to a preset condition.

Alternatively, one of an ending OFDM symbol or an ending time point of at least one of the first uplink control area or the uplink data area is configured by a device, or configured according to a preset condition.

Further, alternatively, in a process of configuration, a base station configures by at least one of a higher layer signaling or a physical layer signaling.

Alternatively, the physical layer signaling is transmitted in the downlink control area through a physical layer.

Alternatively, the downlink control area includes at least one of: a control signaling or authorization information used for an uplink data transmission, or a control signaling used for a downlink data transmission.

Alternatively, the configuration method for the data transmission structure in the embodiment of the present application further includes: in a case where there is a UE only with uplink control needed to be transmitted in the transmission unit, the UE using the first uplink control area to transmit. Preferably, the UE, performs a CCA detection in the guard period area.

Alternatively, the configuration method for the data transmission structure in the embodiment of the present application further includes: a UE not only with uplink control needed to be transmitted but also with uplink data needed to be transmitted in the transmission unit, using at least one of the first uplink control area or the second uplink control area to transmit the uplink control. Preferably, the UE performs a CCA detection in the guard period area.

Alternatively, the configuration method for the data transmission structure in the embodiment of the present application further includes: a UE not only with uplink control needed to be transmitted but also with uplink data needed to be transmitted in the transmission unit, using the first uplink control area to transmit the uplink control and using the uplink data area to transmit the uplink data. Preferably, the UE performs a CCA detection in the guard period area.

Alternatively, the configuration method for the data transmission structure in the embodiment of the present application further includes that: a UE only with uplink data needed to be transmitted in the transmission unit keeps silent in the first uplink control area, or transmits a signal in a frequency domain resource corresponding to the uplink data, or transmits a false uplink control, or transmits a signal at a resource position agreed in advance. Preferably, the UE performs a CCA detection in the guard period area.

Further, alternatively, the false uplink control is transmitted by the UE in frequency domain resources pre-allocated or set for the UE in the first uplink control area.

Alternatively, in the first uplink control area, a part of frequency domain resources is pre-allocated or pre-agreed for the UE to transmit the false uplink control. The part of frequency domain resources is discrete in the frequency domain.

Alternatively, the part of frequency domain resources is evenly discrete in the frequency domain.

Alternatively, the configuration method for the data transmission structure in the embodiment of the present application further includes: configuring or not configuring the first uplink control area according to a preset transmission demand. When not configuring, in a case where the transmission data parameter group includes the uplink data area, the downlink control area, the guard period area and the second uplink control area, the preset configuration order is the downlink control area, the guard period, the uplink data area and the second uplink control area. Or, the method further includes: configuring or not configuring the second uplink control area according to a preset transmission demand. When not configuring, in a case where the transmission data parameter group includes the uplink data area, the downlink control area, the guard period area and the first uplink control area, the preset configuration order is the downlink control area, the guard period, the first uplink control area and the uplink data area.

Alternatively, after the configuring or not configuring the first uplink control area or the second uplink control area according to the preset transmission demand, the method further includes: in a case of configuring or not configuring the second uplink control area, configuring the second uplink control area for uplink data or to keep an idle state; or in a case of configuring or not configuring the first uplink control area, configuring the first uplink control area for uplink data or to keep an idle state. The empty state is used for being configured to perform a CCA detection.

Alternatively, in a case of not configuring the downlink control area and the guard period area, the downlink control area and the guard period area are configured as at least one of the first uplink control area or the uplink data area.

Alternatively, in a case of not configuring the downlink control area but configuring the guard period area, the downlink control area is configured as at least one of the guard period area, the first uplink control area or the uplink data area.

Alternatively, the configuration method for the data transmission structure in the embodiment of the present application further includes: combining a plurality of same or different transmission units obtained according to the preset configuration order into one consecutive transmission unit in time.

Alternatively, in a case where the transmission data parameter group includes an uplink data area, a downlink control area, a first guard period area, a second guard period area and an uplink control area, the preset configuration order is the downlink control area, the first guard period area, the uplink data area, the second guard period area and the uplink control area.

Alternatively, the configuration method for the data transmission structure in the embodiment of the present application further includes: time domain resources of the first guard period area and the second guard period area are agreed in advance; or time domain resources of the first guard period area and the second guard period area are dynamically configured by a device; or total time domain resources of the first guard period area and the second guard period area are fixed, in which the time domain resources of the first guard period area and the second guard period area are configured by the device.

Alternatively, the first guard period area and the second guard period area are used for performing a CCA detection by a UE which transmits data in the uplink data area and the uplink control area.

Alternatively, one of a starting OFDM symbol or a starting time point of at least one of the uplink control area or the uplink data area is configured by a device or agreed according to a preset condition.

Alternatively, one of an ending OFDM symbol or an ending time point of the uplink data area is configured by a device or configured according to a preset condition.

Alternatively, in a process of configuration, a base station configures by at least one of a higher layer signaling or a physical layer signaling.

Alternatively, the physical layer signaling is transmitted in the downlink control area through a physical layer.

Alternatively, the downlink control area includes at least one of: a control signaling or authorization information used for an uplink data transmission, or a control signaling used for a downlink data transmission Alternatively, the configuration method for the data transmission structure in the embodiment of the present application further includes: in a case where there is a UE only with uplink control needed to be transmitted in the transmission unit, the UE using the uplink control area to transmit. Preferably, the UE performs a CCA detection in the second guard period area.

Alternatively, the configuration method for the data transmission structure in the embodiment of the present application further includes: a UE not only with uplink control needed to be transmitted but also with uplink data needed to be transmitted in the transmission unit, transmitting the uplink data in the uplink data area and the uplink control in the uplink control area respectively. Preferably, the UE performs a CCA detection in the first guard period area and the second guard period area respectively.

Alternatively, the configuration method for the data transmission structure in the embodiment of the present application further includes: a UE not only with uplink control needed to be transmitted but also with uplink data needed to be transmitted in the transmission unit, transmitting the uplink data in the uplink data area, the uplink data in the second guard period area and the uplink control in the uplink control area. Preferably, the UE performs a CCA detection in the first guard period area.

Alternatively, the configuration method for the data transmission structure in the embodiment of the present application further includes: a UE not only with uplink control needed to be transmitted but also with uplink data needed to be transmitted in the transmission unit, transmitting the uplink data in the uplink data area, keeping silent and not performing a CCA detection in the second guard period area, and directly transmitting the uplink control in the uplink control area. Preferably, the UE performs a CCA detection in the first guard period area.

Alternatively, the configuration method for the data transmission structure in the embodiment of the present application further includes: a UE only with uplink data needed to be transmitted in the transmission unit, transmitting the uplink data in the uplink data area. Preferably, the UE performs a CCA detection in the first guard period area.

Alternatively, the configuration method for the data transmission structure in the embodiment of the present application further includes: combining a plurality of same or different transmission units obtained according to the preset configuration order into one consecutive transmission unit in time.

Figure 4:
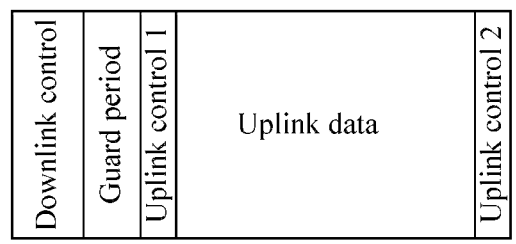
FIG. 4 is a structural diagram of a basic transmission unit in a configuration method for a data transmission structure according to an embodiment of the present invention.
Figure 5:
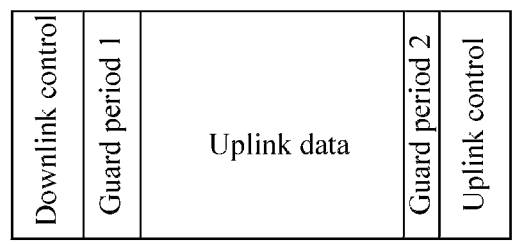
FIG. 5 is a structural diagram of another basic transmission unit in a configuration method for a data transmission structure according to an embodiment of the present invention.

In conclusion, FIGS. 4 and 5 are structural diagrams of two basic transmission units according to embodiments of the present invention. Referring to FIG. 4, provided are a data and control structure as well as the corresponding transmission method. In one transmission unit (such as a subframe, a TTI or multiple consecutive subframes or TTIs, or consecutive multiple OFDM symbols) of the method, it includes (in time sequence): downlink control, guard period, uplink control 1, uplink data and uplink control 2. Whether there is the above uplink control 1 and 2 and respective time domain lengths of the uplink control 1 and 2 may be determined by a configuration of a base station. How to use the structure to perform data and control transmission by the base station and UE is described in detail below.

For convenience of description, the following assumptions are provided. It is assumed that two types of UE are provided in the subframe, a UE1 represents a UE with both uplink data and uplink control and a UE2 represents a UE only with uplink control (without uplink data).

Figure 1:
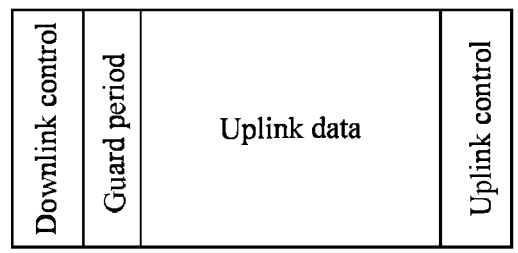
FIG. 1 is a structural diagram of a transmission unit in the related art.

The base station determines whether or not the uplink control 1 exists according to a scheduling situation. For example, when the UE2 needs to transmit on the transmission unit, the uplink control 1 exists, and the uplink control 1 is used for the uplink control transmission of the UE2. In this case, it may also be understood that the uplink control 1 occupies a part of OFDM symbols of original uplink data. It may also be understood that the part of OFDM symbols of the uplink control 2 are migrated to the front as the uplink control 1. In this case, total symbols of the uplink data are not reduced with respect to the symbols of the uplink data in FIG. 1 in the related art. Apparently, a part of the control signaling of the UE1 may also be transmitted in the uplink control 1, and the remaining control signaling may also be transmitted in the uplink control 2.

If the UE2 not exists, the base station preferably configures that the uplink control 1 does not exist. In this case, the symbols of the uplink control 1 are used for the uplink data transmission. It may also be understood that such case is similar to the structure in FIG. 1.

In the above case, the UE1 may perform a CCA detection at a position during the guard period. If there is an interval M between a time point when the UE1 performs the CCA successfully and a starting point of the uplink control 1, the UE1 can only keep not transmitting data or continue to perform the CCA, but may transmit the uplink control or occupation signals in the uplink control 1, and then transmits the uplink data during the uplink data and subsequently transmits uplink control information, such as UCI, a SRS or a SR, on the uplink control 2. The UE2 may also preferably perform the CCA detection at a position during the guard period. If there is an interval N between a time point when the UE2 performs the CCA successfully and the starting point of the uplink control 1, then the UE2 can only transmit uplink control information, such as the UCI, SRS, or SR, starting at the starting point of the uplink control 1. During the interval N, the UE2 can keep not transmitting data or continue to perform the CCA.

The uplink control 2 in FIG. 4 may be deleted, which is also one kind of a transmission unit structure for data transmission. In this case, all uplink control is placed after the guard period. The UE1 and UE2 perform the CCA during the guard period and subsequently transmit the uplink control and/or the uplink data.

The uplink control is used for transmitting the relevant uplink control information transmitted by the UE, such as the UCI, SRS and SR, etc. In the present disclosure, the characteristic is determination of a time domain position of the relevant uplink control information when the relevant uplink control information is transmitted in the transmission unit. Therefore, the uplink control may be an independent control channel, and may also be resources for transmitting the relevant uplink control information. As long as a relative position of the uplink control information in the transmission unit is as described in the present disclosure, the purpose of solving the problem in the present disclosure may be achieved and corresponding benefits may be obtained.

Another structure and the corresponding transmission method are described below.

Referring to FIG. 5, provided are a data and control structure and the corresponding transmission method. In one transmission unit (such as a subframe, a TTI or multiple consecutive subframes or TTIs, or consecutive multiple OFDM symbols) of the method, the transmission unit includes (in time sequence): downlink control, guard period 1, uplink data, guard period 2 and uplink control 2. Whether there are the above guard periods 1 and 2 as well as respective time domain lengths of the guard periods 1 and 2 may be determined according to a configuration of a base station. How to use the structure to perform data and control transmission by the base station and UE is described in detail below.

For convenience of description, the following assumptions are provided. It is assumed that two types of UE are provided in the subframe, a UE1 represents a UE with both uplink data and uplink control and a UE2 represents a UE only with uplink control (without uplink data).

The base station determines whether or not the guard period 2 exists according to the scheduling situation. For example, when the UE2 needs to transmit on the transmission unit, the guard period 2 exists. In this case, the guard period 2 is used for the CCA detection of the UE2. If it is considered that a channel is clear by the CCA detection, the UE2 transmits the uplink control in the uplink control area. In this case, it may also be understood that the guard period 2 occupies the part of OFDM symbols of the original uplink data. It may also be understood that the part of OFDM symbols of the uplink control are taken as the guard period 2, and in this case, the total symbols of the uplink data are not reduced with respect to the symbols of the uplink data in FIG. 1 in the related art. Apparently, if the UE1 needs to transmit the uplink control, the UE1 also needs to perform the CCA in the guard period 2. The CCA detects a clear channel, and then the UE1 transmits the uplink control. The UE1 may also directly transmit the uplink control in the uplink control area without performing the CCA.

If the UE2 not exists, the base station preferably configures that the guard period 2 does not exist. In this case, the symbols of the guard period 2 are used for transmitting the uplink data or the uplink control.

In the above case, the UE2 performs the CCA detection at a position during the guard period 2. If there is an interval between a time point when the UE2 performs the CCA successfully and a starting point of the uplink control, then the UE2 can only start to transmit uplink control information, such as a UCI, an SRS or a SR, at the starting point of the uplink control. During the interval N, the UE2 can keep not transmitting data or continue to perform the CCA.

It can be seen from the above that, referring to FIG. 4, the present application relates to a transmission unit structure design of data and control as well as the corresponding flexible using modes. Firstly, the transmission unit is composed of at least one uplink data area. In a case whether the transmission unit further includes other areas, the corresponding transmission unit configuration needs to be determined according to requirements of UE services planned to be carried or scheduled in each transmission unit during the device transmission. The specific configuration may be seen in the following examples. A configuration of a complete transmission unit is the downlink control, the guard period, the uplink control 1, the uplink data and the uplink control 2 (in this case, a CCA area before the downlink control is excluded from the transmission unit because the CCA range of the device may not be fixed, for example, the device may start to perform the CCA a long time ahead. If the CCA area is included in the transmission unit, a time domain range of performing the CCA by the downlink control needs to be fixed).

The device may dynamically or semi-statically configure time domain duration of each area in the transmission unit, and may also make an agreement on respective fixed durations of the areas in advance. When one of the areas does not exist, it is agreed that the duration of that area is partitioned to another area.

Referring to the schematic diagram of the area configuration of the transmission unit illustrated in FIG. 4, the time domain resources of the uplink control 1 and the uplink control 2 are agreed in advance or dynamically configured by the device. Alternatively, the total time domain resources of the uplink control 1 and the uplink control 2 are fixed, and each part of the time domain resources is configured by the device.

Referring to FIG. 4, during the guard period area, a UE, which needs to transmit data in at least one of the uplink control area 1 or the uplink data area, performs the CCA detection. The device dynamically or semi-statically configure a starting time point of the uplink control area 1 and/or the uplink data area, or a starting OFDM symbol is configured by the device, or agreed in advance. The device may also dynamically configure an ending time point of the uplink control area 1 and/or the uplink data area, or an ending OFDM symbol is configured by the device, or agreed in advance. For example, it is notified by the higher layer signaling and/or the physical layer signaling. Preferably, the device transmits a notification signaling in the downlink control area. The downlink control of the device includes a control signaling or authorization information used for an uplink data transmission and/or a control signaling used for a downlink data transmission. For example, a public area in the downlink control area is used to transmit (in which the downlink control area is divided into a public control area and a UE dedicated area).

Referring to FIG. 4, the device has UE only with uplink control needed to be transmitted in the transmission unit. Such UE preferably uses the uplink control 1 to transmit, so that the uplink control area 2 may be deleted. Alternatively, for the UE not only with uplink control needed to be transmitted but also with uplink data needed to be transmitted in the transmission unit, such UE may use both the uplink control 1 and the uplink control 2, or use them simultaneously. For the UE not only with the uplink control needed to be transmitted but also with the uplink data needed to be transmitted, such UE preferably uses the uplink control 1 to transmit the uplink control, and then transmits the uplink data.

Referring to FIG. 4, for the UE only with the uplink data needed to be transmitted in the transmission unit, such UE performs the CCA during the guard period, (in which, if the CCA is performed successfully, then the channel is detected to be clear), and the UE keeps silent during the uplink control area 1 or transmits a signal in the frequency domain resources corresponding to the uplink data or transmits a false uplink control. The false uplink control is transmitted by the UE in the frequency domain resource pre-allocated or agreed for the UE in the uplink control 1 and is used for the purpose of occupying the channel. A part of frequency domain resources, which is pre-allocated or agreed in advance in the uplink control 1 by the device, is for the UE transmitting the false uplink control. Preferably, the part of frequency domain resources is discrete in the frequency domain, and preferably is evenly discrete in the frequency domain. If the mode of configuration is adopted, both the dynamic signaling and the higher layer signaling may be used, and the configuration signaling is preferably transmitted in a broadcast mode.

Referring to FIG. 4, the uplink control 2 in the transmission unit may not be configured, and the uplink control area 2 is used for the uplink data. The uplink control 1 may not be configured also, and the uplink control area 1 is used for the uplink data. In the transmission unit, when the downlink control may not be configured, and the guard period does not need to be configured, the downlink control and the guard period are used by the uplink control 1 and/or the uplink data. In the transmission unit, when the downlink control may not be configured, and the guard period is configured, in this case, the downlink control is used for at least one of the guard period or the uplink control 1 or the uplink data.

Referring to FIG. 4, different types of transmission units are generated by various configurations. These transmission units may be combined into multiple consecutive transmission units in time according to demands.

Example 1

Examples of configurations of typical transmission units are provided referring to the structure in FIG. 4.

The device (generally referring to a transmitting end device which may be either a base station or a terminal), in the process of transmitting data, may determine the configuration of the transmission unit according to a demand of transmitting data. For example, the demand of transmitting data is data type(s) of the downlink control, the uplink control or the uplink data and corresponding data quantities, and the configuration of the transmission unit may include whether or not to configure the corresponding area and corresponding time domain range or whether or not to configure multiple consecutive transmission units for transmitting, etc.

The device may configure the following structures of the transmission unit.

For convenience of description, it is assumed that a UE1 represents a UE with both uplink data and uplink control needed to be transmitted in that transmission unit, a UE2 represents a UE only with uplink control needed to be transmitted and without uplink data needed to be transmitted in that transmission unit, and a UE3 represents a UE only with uplink data needed to be transmitted and without uplink control needed to be transmitted in that transmission unit.

If the device supports to be executed in unlicensed carriers or shared licensed carriers, the structures of the transmission unit configured by the device are described below.

Configuration 1: the transmission unit includes the downlink control, the guard period, the uplink control 1, the uplink data and the uplink control 2 in sequence. When the device determines that the UE1, the UE2 and the UE3 appear simultaneously in the transmission unit, the transmission unit uses such structure above. In this case, the CCA of all types of the UE is only performed in the guard period, thereby implementing a CCA position sharing. The sharing is sharing and using the guard period of the device switching from a transmitting state to a receiving state (in which the switching is required to reserve a period), thereby having a fewer appearance number of guard periods.

Configuration 2: the transmission unit includes the downlink control, the guard period, the uplink control 1 and the uplink data in sequence. In addition to reducing the guard period in the above configuration 1, in the configuration 2, the device configures the uplink control of the UE to transmit in the uplink control 1. The resources of the uplink control 2 are used for the uplink data.

Configuration 3: the transmission unit includes the downlink control, the guard period and the uplink data in sequence. When the device determines that the transmission unit only has the UE3, the device configures the transmission unit with the configuration 3.

Configuration 4: the transmission unit includes the guard period, the uplink control 1 and the uplink data in sequence. When the device determines that the transmission unit has the UE1, the UE2 and the UE3 and no UE in the transmission unit needs to receive uplink authorization information or downlink authorization information in the downlink control, the device configures the transmission unit with the configuration 4.

Configuration 5: the transmission unit includes the uplink control 1 and the uplink data in sequence. In addition to the demand in the configuration 4, when configuring the transmission unit 5, it is to be noted that a preceding transmission unit of that transmission unit means that the UE is continuous to the preceding transmission unit.

Configuration 6: the transmission unit includes the uplink data in sequence. When the device determines that only the UE3 is transmitted in the transmission unit and consecutively transmitted from the preceding transmission unit, the device configures the transmission unit with the configuration 6.

When the device determines types and quantity of data needed to be transmitted in multiple consecutive subframes, the device may connect the above candidate structures in series in time to perform the data transmission.

Before the downlink control, a range should also be provided for the device to perform the CCA, but in that case no transmission is performed before the range of the CCA, so the transmission unit is counted from transmitting data by the device and its subordinate UE. If the mode of calculating the transmission varies, the range of the CCA before the downlink control may also be calculated into the transmission unit.

Example 2

Examples of typical configurations of the transmission unit are provided for the structure in FIG. 5.

The device (generally referring to the transmitting end device which may be either the base station or the terminal), in the process of transmitting data, may determine the configuration of the transmission unit according to a demand of transmitting data. For example, the demand of transmitting data is data type(s) of the downlink control, the uplink control or the uplink data and corresponding data quantities, and the configuration of the transmission unit may include whether or not to configure the corresponding area and corresponding time domain range or whether or not to configure multiple consecutive transmission units.

The device may configure the following structures of the transmission unit.

For convenience of description, it is assumed that a UE1 represents a UE with both uplink data and uplink control needed to be transmitted in that transmission unit, a UE2 represents a UE only with uplink control needed to be transmitted and without uplink data needed to be transmitted in that transmission unit, and a UE3 represents a UE only with uplink data needed to be transmitted and without uplink control needed to be transmitted in that transmission unit.

If the device supports to be executed in the unlicensed carriers or the shared licensed carriers, the structures of the transmission unit configured by the device are described below.

Configuration 1: the transmission unit includes the downlink control, the guard period 1, the uplink data, the guard period 2 and the uplink control in sequence. When the device determines that the UE1, the UE2 and the UE3 appear simultaneously in the transmission unit, the transmission unit uses such structure. The UE1 performs the CCA in the guard period 1 and the guard period 2 for transmitting the uplink data and the uplink control. The UE1 may also not perform the CCA before transmitting the uplink control. The UE2 performs the CCA in the guard period 2 for transmitting the uplink control. The UE3 performs the CCA in the guard period 1 for transmitting the uplink data.

Configuration 2: the transmission unit includes the downlink control, the guard period 1 and the uplink data in sequence. When the device determines that only the UE3 appears in the transmission unit, the transmission unit uses such structure. The UE3 performs the CCA in the guard period 1 for the uplink data transmission. The guard period 2 and the uplink control area are both used for the uplink data transmission.

Configuration 3: the transmission unit includes the guard period 1, the uplink data, the guard period 2 and the uplink control in sequence. When the device determines that no UE receives the downlink control in the transmission unit, the transmission unit uses such structure. The UE1 performs the CCA in the guard period 1 and the guard period 2 for the uplink data and uplink control transmission. The UE1 may also not perform the CCA before transmitting the uplink control. The UE2 performs the CCA in the guard period 2 for the uplink control transmission. The UE3 performs the CCA in the guard period 1 for the uplink data transmission.

Configuration 4: the transmission unit includes the uplink data, the guard period 2 and the uplink control in sequence. When the device determines that no UE receives the downlink control in the transmission unit and the uplink data of the UE1 and the UE3 in the transmission unit is consecutively continued from the preceding transmission unit, the transmission unit uses such structure. The UE1 and the UE3 do not perform the CCA and directly transmit in the transmission unit. The UE2 performs the CCA in the guard period 2 for the uplink control transmission.

Configuration 5: the transmission unit includes the uplink data and the uplink control in sequence. When the device determines that no UE receives the downlink control in the transmission unit and the uplink data of the UE1 and the UE3 in the transmission unit is consecutively continued from the preceding transmission unit, the transmission unit uses such structure. The UE1 does not perform the CCA and directly transmits in the transmission unit.

Configuration 6: the transmission unit includes the uplink data in sequence. When the device determines that no UE receives the downlink control in the transmission unit and the uplink data of the UE1 and the UE3 in the transmission unit is consecutively continued from the preceding transmission unit, the transmission unit uses such structure. The UE1 and the UE3 do not perform the CCA and directly transmit from the transmission unit.

When the device determines types and quantity of data needed to be transmitted in multiple consecutive subframes, the device may connect the above candidate structures in series in time to perform the data transmission.

Before the downlink control, a range should also be provided for the device to perform the CCA, but in that case no transmission is performed before the range of the CCA, so the transmission unit is counted from transmitting data by the device and its subordinate UE. If the mode of calculating the transmission varies, the range of the CCA before the downlink control may also be calculated into the transmission unit.

Example 3

Based on the example 1, referring to FIG. 4, behaviors of corresponding UE are described.

Based on the three types of UE assumed in example 1, the following processing modes exist.

A position of the UE1 for performing the CCA is the guard period area, and the UE1 may transmit in the uplink control 1 after the CCA succeeds, then transmit the uplink data in the uplink data area, and continue to transmit the control in the uplink control 2. Alternatively, the position of the UE1 for performing the CCA is the guard period area, and the UE1 may transmit in the uplink control 1 after the CCA succeeds, and then transmit the uplink data in the uplink data area, but not transmit the control in the uplink control 2 (in that case, the uplink control 2 may not be configured). Alternatively, the position of the UE1 for performing the CCA is the guard period area, after the CCA succeeds, the UE1 transmits a false control (the false control is used for occupying the channel) in the uplink control 1, then transmits the uplink data in the uplink data area, and transmits the control in the uplink control 2.

The position of the UE2 for performing the CCA is the guard period area, after the CCA succeeds, the UE2 transmits in the uplink control 1.

The position of the UE3 for performing the CCA is the guard period area, after the CCA succeeds, the UE3 needs to transmit the virtual control in the uplink control area 1, and then transmits the uplink data in the uplink data area.

For all the UE, when there is an interval N between a time point when the CCA is performed successfully and a time point planning to transmit the uplink control or the uplink data, the UE is able to transmit the virtual control during the interval N.

A frequency domain position of the virtual control is pre-configured by the base station, or the frequency domain position of the virtual control is dynamically or semi-statically configured by a signaling. The virtual control may be some reference signals, UCI signals or repetition of a part of signals of the uplink control. Specifically, when the virtual control is repetition of a part of time domain signals of the uplink control, the virtual control may be at the same frequency domain position in the interval N area by the UE, or directly repeat the part of time domain signals of the uplink control.

Example 4

Based on the example 2, referring to FIG. 5, behaviors of corresponding UE are described.

Based on the three types of UE assumed in the example 1, the following processing modes exist.

The position of the UE1 for performing the CCA is the guard period area 1, after the CCA succeeds, the UE1 may transmit the uplink data in the uplink data area and then perform the CCA in the guard period area 2, and if succeeds, then the UE1 may transmit the uplink control in the uplink control area. Alternatively, the position of the UE1 for performing the CCA is the guard period area 1, after the CCA succeeds, the UE1 may transmit the uplink data in the uplink data area and continue to transmit the uplink data in the guard period area 2, and then transmit the control in the uplink control (which is equivalent to not performing the CCA in the guard period 2 but directly transmitting the control in the uplink control by the UE1).

The position of the UE2 for performing the CCA is the guard period area 2, after the CCA succeeds, the UE2 transmits the control in the uplink control.

The position of the UE3 for performing the CCA is the guard period area 1, after the CCA succeeds, the UE3 transmits the uplink data in the uplink data area.

For all the UE, when there is an interval N between a time point when the CCA is performed successfully and a time point planning to transmit the uplink control or the uplink data, the UE is able to transmit the virtual control during the interval N.

A frequency domain position of the virtual control is pre-configured by the base station, or the frequency domain position of the virtual control is dynamically or semi-statically configured by a signaling. The virtual control may be some reference signals, UCI signals or repetition of a part of signals of the uplink control. Specifically, when the virtual control is repetition of a part of time domain signals of the uplink control, the virtual control may be at the same frequency domain position in the interval N area by the UE, or directly repeat the part of time domain signals of the uplink control.

From the description of the implementation modes described above, it will be apparent to those skilled in the art that the method in the embodiments described above may be implemented by software plus a necessary general-purpose hardware platform, or may of course be implemented by hardware. However, in many cases, the former is a preferred implementation mode. Based on such understanding, the solutions provided by the present invention substantially or a part contributing to the related art may be embodied in the form of a software product. The computer software product is stored in a storage medium (such as an ROM/RAM, a magnetic disk or an optical disk) and includes several instructions for enabling a terminal device (which may be a mobile phone, a computer, a server, a network device, or the like) to execute the method according to various embodiments of the present invention.

Embodiment 2

The embodiment further provides a configuration apparatus for a data transmission structure. The apparatus is used for implementing the above-mentioned embodiments and preferred implementation modes. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 6:
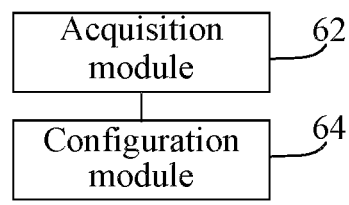
FIG. 6 is a block diagram of a configuration apparatus for a data transmission structure according to an embodiment of the present invention.

FIG. 6 is a block diagram of a configuration apparatus for a data transmission structure according to an embodiment of the present invention. As shown in FIG. 6, the apparatus includes: an acquisition module 62 and a configuration module 64.

The acquisition module 62 is configured to acquire a transmission data parameter group.

The configuration module 64 is configured to configure the transmission data parameter group according to a preset configuration order to obtain a transmission unit. The preset configuration order is a configuration order determined based on a demand of a transmission service.

In the present invention, the transmission data parameter group is acquired, the transmission data parameter group is configured according to the preset configuration order to obtain the transmission unit, in which the preset configuration order is the configuration order determined based on the demand of the transmission service. Thus, the problem of unable to transmit uplink control due to an unsuccessful CCA in the related art may be solved, thereby improving the frequency spectrum efficiency.

Alternatively, in a case where the transmission data parameter group includes an uplink data area, a downlink control area, a guard period area, a first uplink control area and a second uplink control area, the preset configuration order is the downlink control area, the guard period, the first uplink control area, the uplink data area and the second uplink control area.

Alternatively, time domain resources of the first uplink control area and the second uplink control area are preset or are dynamically configured by a device, or total time domain resources of the first uplink control area and the second uplink control area are fixed, and each time domain resource in the total time domain resources is configured by the device. Alternatively, whether or not the first uplink control area exists is dynamically configured by the device, and preferably, when there is a user equipment (UE) which is a UE only with uplink control needed to be transmitted, the device configures that the first uplink control area exists, otherwise the device is allowed to configure that the first uplink control area does not exist.

Further, alternatively, during the guard period area, a UE transmitting data in at least one of the first uplink control area or the uplink data area performs a clear channel assessment (CCA) detection.

Further, alternatively, one of a starting orthogonal frequency division multiplexing (OFDM) symbol or a starting time point of at least one of the first uplink control area or the uplink data area is configured by a device, or configured according to a preset condition.

Further, alternatively, one of an ending OFDM symbol or an ending time point of at least one of the first uplink control area or the uplink data area is configured by a device, or configured according to a preset condition.

Alternatively, in a process of configuration, a base station configures by at least one of a higher layer signaling or a physical layer signaling.

Alternatively, the physical layer signaling is transmitted in the downlink control area through a physical layer.

Alternatively, the downlink control area includes at least one of: a control signaling or authorization information used for an uplink data transmission, or a control signaling used for a downlink data transmission.

Alternatively, the configuration apparatus for the data transmission structure in the embodiment of the present application further includes: a first configuration module. The first configuration module is configured to, in a case where there is a UE only with uplink control needed to be transmitted in the transmission unit, enable the UE to use the first uplink control area to transmit. Preferably, the UE performs a CCA detection in the guard period area.

Alternatively, the configuration apparatus for the data transmission structure in the embodiment of the present application further includes: a second configuration module. The second configuration module is configured to enable a UE not only with uplink control needed to be transmitted but also with uplink data needed to be transmitted in the transmission unit to use at least one of the first uplink control area or the second uplink control area to transmit the uplink control. Preferably, the UE performs a CCA detection in the guard period area.

Alternatively, the configuration apparatus for the data transmission structure in the embodiment of the present application further includes: a third configuration module. The third configuration module is configured to enable a UE not only with uplink control needed to be transmitted but also with uplink data needed to be transmitted in the transmission unit to use at least one of the first uplink control area or the second uplink control area to transmit the uplink control. Preferably, the UE performs a CCA detection in the guard period area.

Alternatively, the configuration apparatus for the data transmission structure in the embodiment of the present application further includes: a fourth configuration module. The fourth configuration module is configured to enable a UE only with uplink data needed to be transmitted in the transmission unit to keep silent in the first uplink control area, or transmit a signal in a frequency domain resource corresponding to the uplink data, or transmit a false uplink control, or transmit a signal at a resource position agreed in advance. Preferably, the UE performs a CCA detection in the guard period area.

Further, alternatively, the false uplink control is transmitted by the UE in frequency domain resources pre-allocated or set for the UE in the first uplink control area.

Alternatively, in the first uplink control area, a part of frequency domain resources is pre-allocated or pre-agreed for the UE to transmit the false uplink control. The part of frequency domain resources is discrete in the frequency domain.

Further, alternatively, the part of frequency domain resources is evenly discrete in the frequency domain.

Alternatively, the configuration apparatus for the data transmission structure in the embodiment of the present application further includes: a fifth configuration module. The fifth configuration module is configured to configure or not configure the first uplink control area according to a preset transmission demand. When not configuring, in a case where the transmission data parameter group includes the uplink data area, the downlink control area, the guard period area and the second uplink control area, the preset configuration order is the downlink control area, the guard period, the uplink data area and the second uplink control area. Or, the fifth configuration module is configured to configure or not configure the second uplink control area according to a preset transmission demand. When not configuring, in a case where the transmission data parameter group includes the uplink data area, the downlink control area, the guard period area and the first uplink control area, the preset configuration order is the downlink control area, the guard period, the first uplink control area and the uplink data area.

Further, alternatively, the configuration apparatus for the data transmission structure in the embodiment of the present application further includes: a sixth configuration module. The sixth configuration module is configured to, after configuring or not configuring the first uplink control area or the second uplink control area according to the preset transmission demand, in a case of configuring or not configuring the second uplink control area, configure the second uplink control area for uplink data or to keep an idle state, or in a case of configuring or not configuring the first uplink control area, configure the first uplink control area for uplink data or to keep an idle state.

Alternatively, the configuration module is configured to configure, in a case of not configuring the downlink control area and the guard period area, the downlink control area and the guard period area as at least one of the first uplink control area or the uplink data area.

Alternatively, the configuration module is configured to configure, in a case of not configuring the downlink control area but configuring the guard period area, the downlink control area as at least one of the guard period area, the first uplink control area or the uplink data area.

Alternatively, the configuration apparatus for the data transmission structure in the embodiment of the present application further includes: a first combination module, which is configured to combine a plurality of same or different transmission units obtained according to the preset configuration order into one consecutive transmission unit in time.

Alternatively, in a case where the transmission data parameter group includes an uplink data area, a downlink control area, a first guard period area, a second guard period area and an uplink control area, the preset configuration order is the downlink control area, the first guard period area, the uplink data area, the second guard period area and the uplink control area.

Further, alternatively, time domain resources of the first guard period area and the second guard period area are agreed in advance; or time domain resources of the first guard period area and the second guard period area are dynamically configured by a device; or total time domain resources of the first guard period area and the second guard period area are fixed, where the time domain resources of the first guard period area and the second guard period area are configured by the device.

Alternatively, the first guard period area and the second guard period area are configured that in which a UE transmitting data in the uplink data area and the uplink control area performs a CCA detection.

Alternatively, one of a starting OFDM symbol or a starting time point of at least one of the uplink control area or the uplink data area is configured by a device or agreed according to a preset condition.

Alternatively, one of an ending OFDM symbol or an ending time point of the uplink data area is configured by a device or configured according to a preset condition.

Further, alternatively, in a process of configuration, a base station configures by at least one of a higher layer signaling or a physical layer signaling.

Alternatively, the physical layer signaling is transmitted in the downlink control area through a physical layer.

Alternatively, the downlink control area includes at least one of: a control signaling or authorization information used for an uplink data transmission, or a control signaling used for a downlink data transmission.

Alternatively, the configuration apparatus for the data transmission structure in the embodiment of the present application further includes: a seventh configuration module, which is configured to, in a case where there is a UE only with uplink control needed to be transmitted in the transmission unit, enable the UE to use the uplink control area to transmit. Preferably, the UE performs a CCA detection in the second guard period area.

Alternatively, the configuration apparatus for the data transmission structure in the embodiment of the present application further includes: an eighth configuration module, which is configured to, in a case where there is a UE only with uplink control needed to be transmitted in the transmission unit, enable the UE to use the uplink control area to transmit. Preferably, the UE performs a CCA detection in the second guard period area.

Alternatively, the configuration apparatus for the data transmission structure in the embodiment of the present application further includes: a ninth configuration module, which is configured to enable a UE not only with uplink control needed to be transmitted but also with uplink data needed to be transmitted in the transmission unit to transmit the uplink data in the uplink data area, the uplink data in the second guard period area and the uplink control in the uplink control area. Preferably, the UE performs a CCA detection in the first guard period area.

Alternatively, the configuration apparatus for the data transmission structure in the embodiment of the present application further includes: a tenth configuration module, which is configured to enable a UE not only with uplink control needed to be transmitted but also with uplink data needed to be transmitted in the transmission unit to transmit the uplink data in the uplink data area, keep silent and not perform a CCA detection in the second guard period area, and directly transmit the uplink control in the uplink control area. Preferably, the UE performs a CCA detection in the first guard period area.

Alternatively, the configuration apparatus for the data transmission structure in the embodiment of the present application further includes: an eleventh configuration module, which is configured to enable a UE only with uplink data needed to be transmitted in the transmission unit to transmit uplink data in the uplink data area. Preferably, the UE performs a CCA detection in the first guard period area.

Alternatively, the configuration apparatus for the data transmission structure in the embodiment of the present application further includes: a second combination module, which is configured to, in a case where there is a UE only with uplink data needed to be transmitted in the transmission unit, enable the UE to perform a CCA detection in the first guard period area.

It is to be illustrated that the various modules described above may be implemented by software or hardware. Implementation by hardware may, but is not limited to, be performed in the following modes: the various modules described above are located in a same processor, or the various modules described above are located in their respective processors in any combination form.

Embodiment 3

The embodiment of the present invention further provides a storage medium. Alternatively, in this embodiment, the storage medium may be configured to store program codes for executing the steps described below.

In step S1: a transmission data parameter group is acquired.

In step S2: according to a preset configuration order, the transmission data parameter group is configured to obtain a transmission unit, where the preset configuration order is a configuration order determined based on a demand of a transmission service.

Alternatively, the storage medium is further configured to store program codes for executing the step described below. In a case where the transmission data parameter group includes an uplink data area, a downlink control area, a guard period area, a first uplink control area and a second uplink control area, the preset configuration order is the downlink control area, the guard period, the first uplink control area, the uplink data area and the second uplink control area.

Alternatively, the storage medium is further configured to store program codes for executing the steps described below. Time domain resources of the first uplink control area and the second uplink control area are preset or dynamically configured by a device, or total time domain resources of the first uplink control area and the second uplink control area are fixed, and each time domain resource in the total time domain resources is configured by the device. Or whether or not the first uplink control area exists is dynamically configured by the device, and preferably, when there is a user equipment (UE) which is a UE only with uplink control needed to be transmitted, the device configures that the first uplink control area exists, otherwise the device is allowed to configure that the first uplink control area does not exist.

Alternatively, the storage medium is further configured to store program codes for executing the step described below. During the guard period area, a UE transmitting data in at least one of the first uplink control area or the uplink data area performs a clear channel assessment (CCA) detection.

Further, alternatively, the storage medium is further configured to store program codes for executing the step described below. One of a starting orthogonal frequency division multiplexing (OFDM) symbol or a starting time point of at least one of the first uplink control area or the uplink data area is configured by a device, or configured according to a preset condition.

Alternatively, the storage medium is further configured to store program codes for executing the step described below. One of an ending OFDM symbol or an ending time point of at least one of the first uplink control area or the uplink data area is configured by a device, or configured according to a preset condition.

Alternatively, the storage medium is further configured to store program codes for executing the step described below. In a process of configuration, a base station configures by at least one of a higher layer signaling or a physical layer signaling.

Alternatively, the storage medium is further configured to store program codes for executing the step described below. The physical layer signaling is transmitted in the downlink control area through a physical layer.

Alternatively, the storage medium is further configured to store program codes for executing the step described below. The downlink control area includes at least one of: a control signaling or authorization information used for an uplink data transmission, or a control signaling used for a downlink data transmission.

Alternatively, the storage medium is further configured to store program codes for executing the steps described below. The method further includes: in a case where there is a UE only with uplink control needed to be transmitted in the transmission unit, the UE using the first uplink control area to transmit. Preferably, the UE performs a CCA detection in the guard period area.

Alternatively, the storage medium is further configured to store program codes for executing the steps described below. The method further includes: a UE not only with uplink control needed to be transmitted but also with uplink data needed to be transmitted in the transmission unit, using at least one of the first uplink control area or the second uplink control area to transmit the uplink control. Preferably, the UE performs a CCA detection in the guard period area.

Alternatively, the storage medium is further configured to store program codes for executing the steps described below. The method further includes: a UE not only with uplink control needed to be transmitted but also with uplink data needed to be transmitted in the transmission unit, using the first uplink control area to transmit the uplink control, and using the uplink data area to transmit the uplink data. Preferably, the UE performs a CCA detection in the guard period area.

Alternatively, the storage medium is further configured to store program codes for executing the steps described below. The method further includes: a UE only with uplink data needed to be transmitted in the transmission unit, keeping silent in the first uplink control area, or transmitting a signal in a frequency domain resource corresponding to the uplink data, or transmitting a false uplink control, or transmitting a signal at a resource position agreed in advance. Preferably, the UE performs a CCA detection in the guard period area.

Further, alternatively, the storage medium is further configured to store program codes for executing the step described below. The false uplink control is transmitted by the UE in frequency domain resources pre-allocated or set for the UE in the first uplink control area.

Alternatively, the storage medium is further configured to store program codes for executing the step described below. In the first uplink control area, a part of frequency domain resources is pre-allocated or pre-agreed for the UE to transmit the false uplink control. The part of frequency domain resources is discrete in the frequency domain.

Alternatively, the storage medium is further configured to store program codes for executing the step described below. The part of frequency domain resources is evenly discrete in the frequency domain.

Alternatively, the storage medium is further configured to store program codes for executing the steps described below. The method further includes: configuring or not configuring the first uplink control area according to a preset transmission demand. When not configuring, in a case where the transmission data parameter group includes the uplink data area, the downlink control area, the guard period area and the second uplink control area, the preset configuration order is the downlink control area, the guard period, the uplink data area and the second uplink control area. Or the method further includes: configuring or not configuring the second uplink control area according to a preset transmission demand. When not configuring, in a case where the transmission data parameter group includes the uplink data area, the downlink control area, the guard period area and the first uplink control area, the preset configuration order is the downlink control area, the guard period, the first uplink control area and the uplink data area.

Alternatively, the storage medium is further configured to store program codes for executing the steps described below. After the configuring or not configuring the first uplink control area or the second uplink control area according to the preset transmission demands, the method further includes: in a case of configuring or not configuring the second uplink control area, configuring the second uplink control area for uplink data or to keep an idle state; or in a case of configuring or not configuring the first uplink control area, configuring the first uplink control area for uplink data or to keep an idle states.

Alternatively, the storage medium is further configured to store program codes for executing the step described below. In a case of not configuring the downlink control area and the guard period area, the downlink control area and the guard period area are configured as at least one of the first uplink control area or the uplink data area.

Alternatively, the storage medium is further configured to store program codes for executing the step described below. In a case of not configuring the downlink control area but configuring the guard period area, the downlink control area is configured as at least one of the guard period area, the first uplink control area or the uplink data area.

Alternatively, the storage medium is further configured to store program codes for executing the step described below.

The method further includes: combining multiple same or different transmission units obtained according to the preset configuration order into one consecutive transmission unit in time.

Alternatively, the storage medium is further configured to store program codes for executing the step described below. In a case where the transmission data parameter group includes an uplink data area, a downlink control area, a first guard period area, a second guard period area and an uplink control area, the preset configuration order is the downlink control area, the first guard period area, the uplink data area, the second guard period area and the uplink control area.

Alternatively, the storage medium is further configured to store program codes for executing the step described below. The method further includes: time domain resources of the first guard period area and the second guard period area are agreed in advance or dynamically configured by a device; or total time domain resources of the first guard period area and the second guard period area are fixed, where the time domain resources of the first guard period area and the second guard period area are configured by the device.

Alternatively, the storage medium is further configured to store program codes for executing the step described below. The first guard period area and the second guard period area are used for performing a CCA detection by a UE transmitting data in the uplink data area and the uplink control area.

Alternatively, the storage medium is further configured to store program codes for executing the step described below. One of a starting OFDM symbol or a starting time point of at least one of the uplink control area or the uplink data area is configured by a device or agreed according to a preset condition.

Alternatively, the storage medium is further configured to store program codes for executing the step described below. One of an ending OFDM symbol or an ending time point of the uplink data area is configured by a device or configured according to a preset condition Alternatively, the storage medium is further configured to store program codes for executing the step described below. In a process of configuration, a base station configures by at least one of a higher layer signaling or a physical layer signaling.

Alternatively, the storage medium is further configured to store program codes for executing the step described below. The physical layer signaling is transmitted in the downlink control area through a physical layer.

Alternatively, the storage medium is further configured to store program codes for executing the step described below. The downlink control area includes at least one of: a control signaling or authorization information used for an uplink data transmission, or a control signaling used for a downlink data transmission.

Alternatively, the storage medium is further configured to store program codes for executing the steps described below. The method further includes: in a case where there is a UE only with uplink control needed to be transmitted in the transmission unit, the UE using the uplink control area to transmit. Preferably, the UE performs a CCA detection in the second guard period area.

Alternatively, the storage medium is further configured to store program codes for executing the steps described below. The method further includes: a UE not only with uplink control needed to be transmitted but also with uplink data needed to be transmitted in the transmission unit, transmitting the uplink data in the uplink data area and the uplink control in the uplink control area respectively. Preferably, the UE performs a CCA detection in the first guard period area and the second guard period area respectively.

Alternatively, the storage medium is further configured to store program codes for executing the steps described below. The method further includes: a UE not only with uplink control needed to be transmitted but also with uplink data needed to be transmitted in the transmission unit, transmitting the uplink data in the uplink data area, the uplink data in the second guard period area and the uplink control in the uplink control area. Preferably, the UE performs a CCA detection in the first guard period area.

Alternatively, the storage medium is further configured to store program codes for executing the steps described below. The method further includes: a UE not only with uplink control needed to be transmitted but also with uplink data needed to be transmitted in the transmission unit, transmitting the uplink data in the uplink data area, keeping silent and not performing a CCA detection in the second guard period area, and directly transmitting the uplink control in the uplink control area. Preferably, the UE performs a CCA detection in the first guard period area.

Alternatively, the storage medium is further configured to store program codes for executing the steps described below. The method further includes: a UE only with uplink data needed to be transmitted in the transmission unit, transmitting uplink data in the uplink data area. Preferably, the UE performs a CCA detection in the first guard period area.

Alternatively, the storage medium is further configured to store program codes for executing the step described below. The method further includes: combining multiple same or different transmission units obtained according to the preset configuration order into one consecutive transmission unit in time.

Apparently, those skilled in the art should understand that the above-mentioned modules or steps of the present invention may be implemented by a general-purpose computing device. The modules or steps may be integrated on a single computing device or distributed on a network formed by multiple computing devices. Alternatively, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present invention is not limited to any specific combination of hardware and software.

The above are only preferred embodiments of the present invention and are not intended to limit the present invention. For those skilled in the art, the present invention may have various modifications and variations. Any modifications, equivalent substitutions, improvements and the like made within the spirit and principle of the present invention should fall within the scope of the present invention.

INDUSTRIAL APPLICABILITY

The solutions provided by the embodiments of the present invention may be applied to the process of configuration for the data transmission structure. The transmission data parameter group is acquired, the transmission data parameter group is configured according to the preset configuration order to obtain the transmission unit, in which the preset configuration order is the configuration order determined based on the demand of the transmission service. Thus, the problem of unable to transmit uplink control due to an unsuccessful CCA in the related art may be solved, thereby improving the frequency spectrum efficiency.

What is claimed is:

1. A method of wireless communication, comprising:
   determining, by a base station, a transmission data parameter group that includes parameters configuring an uplink data resource area, a downlink control resource area, a first uplink control resource area, and a second uplink control resource area;
   determining, by the base station based on the transmission data parameter group, a structure of a transmission unit according to a preset configuration order, wherein the preset configuration order specifies that the downlink control resource area, a guard period area, the first uplink control resource area, the uplink data resource area, and the second uplink control area are positioned sequentially in a time domain; and
   performing a transmission of the transmission unit with a user equipment according to the structure of the transmission unit.

2. The method of claim 1, wherein the transmission unit comprises multiple orthogonal frequency division multiplexing (OFDM) symbols.

3. The method of claim 1, further comprises:
   dynamically configuring, by the base station, time domain resources of the first uplink control resource area and the second uplink control resource area.

4. The method of claim 1, wherein the transmission data parameter group configures a starting point of the uplink data resource area.

5. The method of claim 4, wherein the transmission data parameter group further indicates a length of the uplink data resource area.

6. A method of wireless communication, comprising:
   receiving, by a user equipment, a transmission data parameter group from a base station, wherein the transmission data group includes parameters configuring an uplink data resource area, a downlink control resource area, a first uplink control resource area, and a second uplink control resource area;
   determining, by the user equipment, a structure of a transmission unit determined based on the transmission data parameter according to a preset configuration order, wherein the preset configuration order specifies that the downlink control resource area, a guard period area, the first uplink control resource area, the uplink data resource area, and the second uplink control area are positioned sequentially in a time domain; and
   performing a transmission of the transmission unit with the base station according to the structure of the transmission unit.

7. The method of claim 6, wherein the transmission unit comprises multiple orthogonal frequency division multiplexing (OFDM) symbols.

8. The method of claim 6, wherein the guard period area provides a transition between receiving and transmitting for the user equipment.

9. The method of claim 6, wherein the transmission data parameter group configures a starting point of the uplink data resource area.

10. The method of claim 9, wherein the transmission data parameter group further indicates a length of the uplink data resource area.

11. A device of wireless communication, comprising a processor configured to:
    determine a transmission data parameter group that includes parameters configuring an uplink data resource area, a downlink control resource area, a first uplink control resource area, and a second uplink control resource area;
    determine, based on the transmission data parameter group, a structure of a transmission unit according to a preset configuration order, wherein the preset configuration order specifies that the downlink control resource area, a guard period area, the first uplink control resource area, the uplink data resource area, and the second uplink control area are positioned sequentially in a time domain; and
    perform a transmission of the transmission unit with a user equipment according to the structure of the transmission unit.

12. The device of claim 11, wherein the transmission unit comprises multiple orthogonal frequency division multiplexing (OFDM) symbols.

13. The device of claim 11, wherein the guard period area provides a transition between receiving and transmitting for the user equipment.

14. The device of claim 11, wherein the transmission data parameter group configures a starting point of the uplink data resource area.

15. The device of claim 14, wherein the transmission data parameter group further indicates a length of the uplink data resource area.

16. A device of wireless communication, comprising a processor configured to:
    receive a transmission data parameter group from a base station, wherein the transmission data group includes parameters configuring an uplink data resource area, a downlink control resource area, a first uplink control resource area, and a second uplink control resource area;
    determine a structure of a transmission unit determined based on the transmission data parameter according to a preset configuration order, wherein the preset configuration order specifies that the downlink control resource area, a guard period area, the first uplink control resource area, the uplink data resource area, and the second uplink control area are positioned sequentially in a time domain; and
    perform a transmission of the transmission unit with the base station according to the structure of the transmission unit.

17. The device of claim 16, wherein the transmission unit comprises multiple orthogonal frequency division multiplexing (OFDM) symbols.

18. The device of claim 16, wherein the guard period area provides a transition between receiving and transmitting for the user equipment.

19. The device of claim 16, wherein the transmission data parameter group configures a starting point of the uplink data resource area.

20. The device of claim 19, wherein the transmission data parameter group further indicates a length of the uplink data resource area.

* * * * *